(12) United States Patent
Perroud et al.

(10) Patent No.: US 8,550,233 B2
(45) Date of Patent: Oct. 8, 2013

(54) SYSTEM FOR SUPPLYING COMPONENTS

(75) Inventors: Sebastien Perroud, Niederwangen (CH); Tobias Hafner, Muri (CH); Yves Mussard, Peseux (CH)

(73) Assignee: Asyril SA, Villaz-Saint-Pierre (CH)

( * ) Notice: Subject to any disclaimer, the term of this patent is extended or adjusted under 35 U.S.C. 154(b) by 168 days.

(21) Appl. No.: 13/146,102

(22) PCT Filed: Feb. 2, 2010

(86) PCT No.: PCT/EP2010/051239
§ 371 (c)(1),
(2), (4) Date: Jul. 25, 2011

(87) PCT Pub. No.: WO2010/089290
PCT Pub. Date: Aug. 12, 2010

(65) Prior Publication Data
US 2011/0284344 A1 Nov. 24, 2011

(30) Foreign Application Priority Data
Feb. 5, 2009 (CH) .......................................... 166/09

(51) Int. Cl.
*B65G 27/34* (2006.01)
(52) U.S. Cl.
USPC ...................... 198/766; 198/502.2; 198/752.1; 198/760
(58) Field of Classification Search
USPC ........... 198/502.2, 619, 752.1, 759, 760, 763, 198/766, 768, 769
See application file for complete search history.

(56) References Cited

U.S. PATENT DOCUMENTS

| | | | | |
|---|---|---|---|---|
| 3,881,605 A * | 5/1975 | Grossman | ...................... | 414/730 |
| 4,819,784 A * | 4/1989 | Sticht | .............................. | 198/395 |
| 5,284,003 A * | 2/1994 | Goodman et al. | .............. | 53/437 |
| 5,314,055 A * | 5/1994 | Gordon | .......................... | 198/395 |
| 5,924,546 A * | 7/1999 | Funaya | .......................... | 198/395 |
| 6,056,108 A * | 5/2000 | Buchi et al. | .................... | 198/395 |
| 6,206,180 B1 * | 3/2001 | Sekine et al. | ................. | 198/757 |
| 6,315,103 B1 * | 11/2001 | Boucherie | ...................... | 198/395 |
| 6,318,542 B1 * | 11/2001 | Ikeda et al. | .................... | 198/769 |
| 6,481,560 B2 * | 11/2002 | Kearney | .......................... | 198/396 |
| 6,598,730 B1 | 7/2003 | Gertsch et al. | | |
| 6,637,585 B2 * | 10/2003 | Takasan et al. | ............. | 198/752.1 |

(Continued)

FOREIGN PATENT DOCUMENTS

| | | |
|---|---|---|
| EP | 0 916 457 A2 | 5/1999 |
| FR | 2 604 376 A | 4/1988 |
| WO | 2007/109109 A2 | 9/2007 |

OTHER PUBLICATIONS

International Search Report, dated Mar. 22, 2010, from corresponding PCT application.

*Primary Examiner* — Douglas Hess
(74) *Attorney, Agent, or Firm* — Young & Thompson

(57) ABSTRACT

A system (1) for supplying components, particularly for transporting small components includes a vibrating device (2) provided with a plate (3) forming a surface for enabling the components to be grasped by a robot and a vibrating element (12) arranged to be capable of vibrating the plate (3) in one of the three directions in space and to be capable of vibrating the plate (3) in directions corresponding to any combination whatsoever of the three directions x, y and z. For this purpose, the vibrating element includes vibrating actuators (12) respectively including a vibrating element arranged to move with at least five degrees of freedom.

17 Claims, 3 Drawing Sheets

(56) References Cited

U.S. PATENT DOCUMENTS

| | | | |
|---|---|---|---|
| 6,702,102 B2 * | 3/2004 | Kraus et al. | 198/758 |
| 6,854,585 B2 * | 2/2005 | Brooks et al. | 198/394 |
| RE38,756 E * | 7/2005 | Kraus et al. | 198/764 |
| 7,028,829 B2 | 4/2006 | Buchi | |
| 7,036,653 B2 * | 5/2006 | Reznik et al. | 198/401 |
| 7,182,200 B2 * | 2/2007 | Narukawa et al. | 198/763 |
| 7,213,700 B2 * | 5/2007 | Narukawa et al. | 198/763 |
| 7,413,073 B2 * | 8/2008 | Narukawa et al. | 198/758 |
| 7,472,898 B2 * | 1/2009 | Kraus | 267/136 |
| 7,559,737 B2 * | 7/2009 | Ray et al. | 414/792.9 |
| 7,650,986 B2 * | 1/2010 | Kwasniewicz | 198/750.8 |
| 8,096,407 B1 * | 1/2012 | Gregor | 198/769 |
| 8,141,714 B2 * | 3/2012 | Burkhard | 209/365.1 |
| 8,230,990 B2 * | 7/2012 | Lynch et al. | 198/752.1 |
| 8,246,841 B2 * | 8/2012 | Hodgson | 210/780 |
| 8,359,995 B2 * | 1/2013 | Bakos et al. | 118/13 |

\* cited by examiner

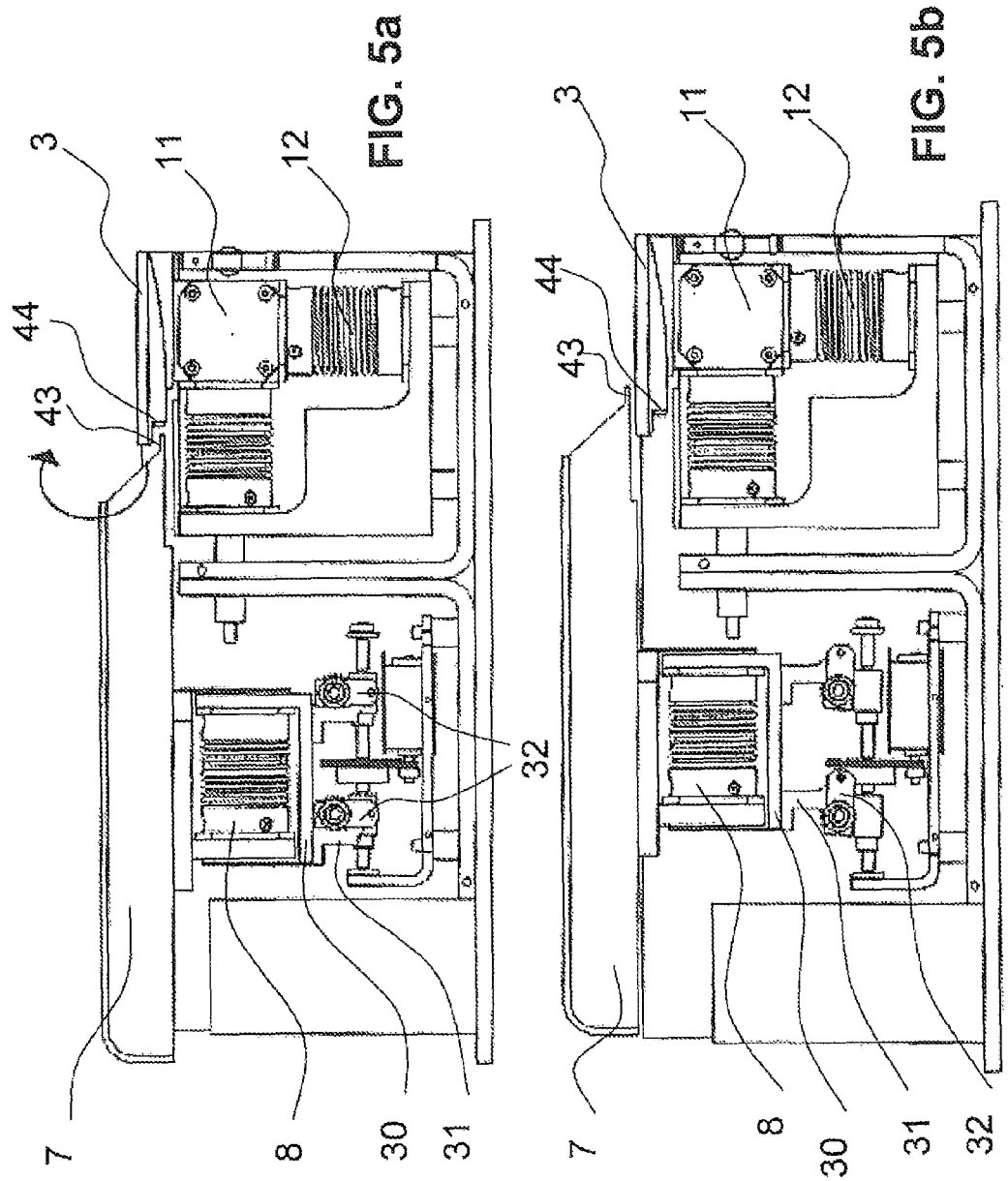

SYSTEM FOR SUPPLYING COMPONENTS

TECHNICAL FIELD

The present invention relates to a system for supplying components comprising a vibrating device provided with a plate forming a surface for enabling the components to be grasped by a robot and a vibrating means arranged to be capable of vibrating said plate.

BACKGROUND OF THE INVENTION

Such a system can be used to transport components to a robot comprising a handling arm, which will grasp the components on the plate. In many fields, such as electronics or horology, the components are conveyed in bulk on assembly lines. To be able to use them in an automated process, it is necessary to provide a supply system. Supply systems already exist for components of average to large size (>3 $mm^2$), such as vibrating bowls or centrifuges. However, the process of supplying small components, smaller than 3 $mm^2$, is still very poorly mastered and is left largely to chance. This comes from the fact that the stresses and forces present for the small components, such as capillarity and electrostatics, come into play and compete with the gravitational force, used in the traditional techniques cited above for the larger components. These "parasitic" forces cause "adhesion" of the components to each other or against the surrounding surfaces, such that the supply systems traditionally used for components of average to large size cannot be used in the field of small components.

Small component supply systems have been developed and for the most part comprise a vibrating plate forming a grasping surface, on which the components must be separated from each other as well as possible, and have the orientation most favorable to grasping by the robot.

Such systems are for example described in U.S. Pat. No. 7,028,829 and U.S. Pat. No. 6,598,730. These systems comprise plates arranged to vibrate only in a vertical direction. However, these systems lack efficiency and do not make it possible to supply the robot suitably when it involves transporting small components.

Furthermore, the supply systems are generally equipped with an element to recover components fallen from the vibrating plate and return them to circulation. One such element is for example described in U.S. Pat. No. 6,598,730. It consists of a vertically mobile element that is inserted between the storage reservoir and the vibrating plate, to allow the components to fall by gravity from the reservoir to the vibrating plate. However, the movement of the components between the storage reservoir, the recirculation element and the vibrating plate is due solely to gravity, the storage reservoir and the recirculation element having downwardly slanted walls. Such a device therefore requires a larger bulk due to the place taken up by the slanted storage reservoir. Moreover, it cannot be used when the transport of the components is done using a linear conveyor, the components not being able to move by gravity between the conveyor and the recirculation element.

Application WO 2007/109109 describes a device and a method for applying a movement to one or more items, consisting in particular of placing this or these item(s) on a surface of a support member and applying a vibrational movement to the support member by vibrating actuators connected thereto, the vibrational movement comprising at least one vibratory component rotating around one or more axes out of alignment in relation to the gravity vector in order to produce effective force fields on the surface. More particularly, the support member is a plate that vibrates with six degrees of freedom, under the action of eight linear actuators arranged so as to exert forces and torques on the plate in arbitrary directions at all times. This system has the drawbacks of being complex and bulky. Moreover, it has the drawback of generating, in all cases, at least one rotation of the surface of the support member. This rotation creates different accelerations on the components depending on their position relative to the axis of rotation. If the components are on the axis of rotation, they will move little. On the other hand, if they are remote, they will undergo great acceleration. This effect is harmful in the context of a supply of components for which one seeks to act on the entire surface with the same vibrational effects so as to have homogenous behavior of the components.

One aim of the present invention is therefore to offset these drawbacks, by proposing a system for supplying components allowing effective separation and orientation of said components.

Another aim of the present invention is to propose a system for supplying components that is particularly suitable for transporting small components, as defined above.

Another aim of the present invention is to propose a system for supplying components making it possible to easily return the components to circulation, in particular when the conveyor used to transport the components is a linear conveyor.

BRIEF DESCRIPTION OF THE INVENTION

To that end, and according to the present invention, proposed is a system for supplying components comprising a vibrating device provided with a plate forming a surface for enabling the components to be grasped by a robot and vibrating means arranged to be capable of vibrating said plate in one of the three directions x, y, z, and to be capable of vibrating said plate in directions corresponding to any combination of these three directions x, y and z.

According to the invention, said vibrating means comprise vibrating actuators respectively comprising a vibrating element arranged to move with at least five degrees of freedom.

The vibrations of the plate in the three directions make it possible to better control the distribution of the components on its surface and to increase the percentage of correctly oriented components.

Preferably, the vibrating means are arranged to make said plate vibrate at a frequency between 5 Hz and 500 Hz, preferably between 50 Hz and 300 Hz.

Advantageously, the vibrating device can also comprise a frame, a vibrating support supporting the plate, the vibrating support being maintained by the actuators respectively connected on the one hand to said vibrating support and on the other hand to said frame.

According to one alternative embodiment, the vibrating support can be parallelepiped, and the vibrating means can be made up of at least three actuators respectively positioned in the directions x, y, and z, on the faces of said vibrating support, with the exception of the face supporting the plate.

Particularly preferably, each of the vibrating actuators can comprise a stationary element mounted on the frame, the vibrating element being movably mounted relative to the stationary element and connected to the vibrating support, a guide in the form of a bellows connecting the stationary and vibrating elements and arranged to allow the vibrating element to move with three degrees of freedom in translation and at least two degrees of freedom in rotation, and a vibration generator arranged to move the vibrating element and make it vibrate relative to the stationary element following a translational movement, in directions x, y and z, respectively.

The vibration generator can be of the piezoelectric, electromagnetic, pneumatic or hydraulic type.

Advantageously, each vibrating actuator can be controlled independently in terms of frequency, amplitude and phase, and is able to produce arbitrary waves.

Advantageously, the supply system can also comprise a conveyor, arranged to convey components on the plate of the vibrating device.

Preferably, the conveyor can be a linear conveyor set in motion by a linear vibrator.

Advantageously, the supply system also comprises means for driving the conveyor arranged to impart a circular translational movement to said conveyor between an upper position, in which said conveyor is positioned above the vibrating device, and a lower position, in which said conveyor is positioned below the vibrating device. Said driving means of the conveyor can comprise a conveyor support plate comprising four feet respectively mounted articulated at one end of four legs driven in rotation by their other end, so as to form two deformable parallelograms, and a mechanism for driving said legs in rotation.

Advantageously, the conveyor can have, at the end thereof, on the side of the vibrating device, a transverse rim, the plate of the vibrating device comprising a shoulder arranged to receive the transverse rim of the conveyor when said conveyor is in the lower position.

Advantageously, the conveyor can be mounted removably so that it can be disassembled and serve as a storage reservoir.

Furthermore, the supply system can comprise a viewing system arranged to identify the position of the components on the plate of the vibrating device and actuate the vibrating device and the robot as a function of the distribution and orientation of the components. When the system also comprises a conveyor, the viewing system can be arranged also to actuate the conveyor as a function of the distribution and orientation of the components.

BRIEF DESCRIPTION OF THE DRAWINGS

Other features of the present invention will appear more clearly upon reading the following description, done in reference to the appended drawings, in which:

FIG. 5a is a cross-sectional view of the vibrating device and the linear conveyor in the lower position, and FIG. 5b is a cross-sectional view of the vibrating device and the linear conveyor in the upper position.

DETAILED DESCRIPTION OF THE INVENTION

Figure 1:
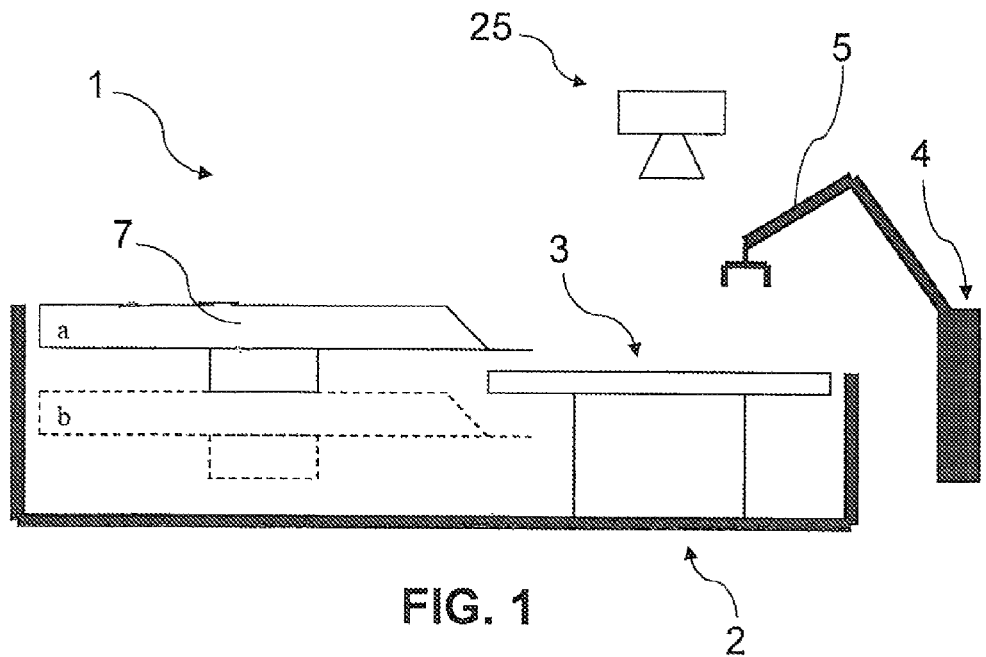
FIG. 1 is a diagrammatic view of a supply system according to the invention.
Figure 2:
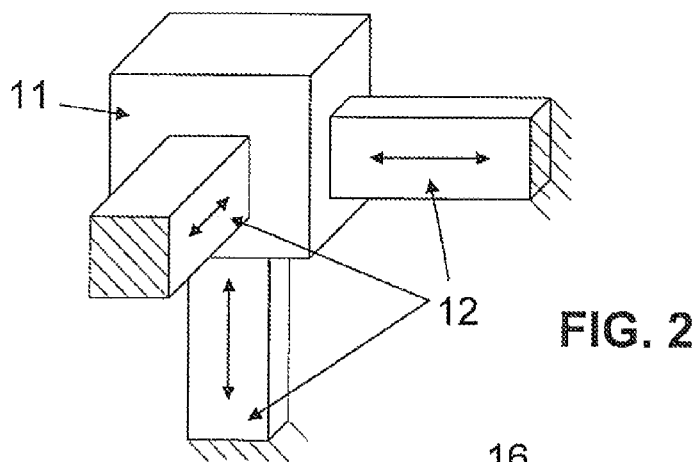
FIG. 2 is a view of the vibrating device.
Figure 4:
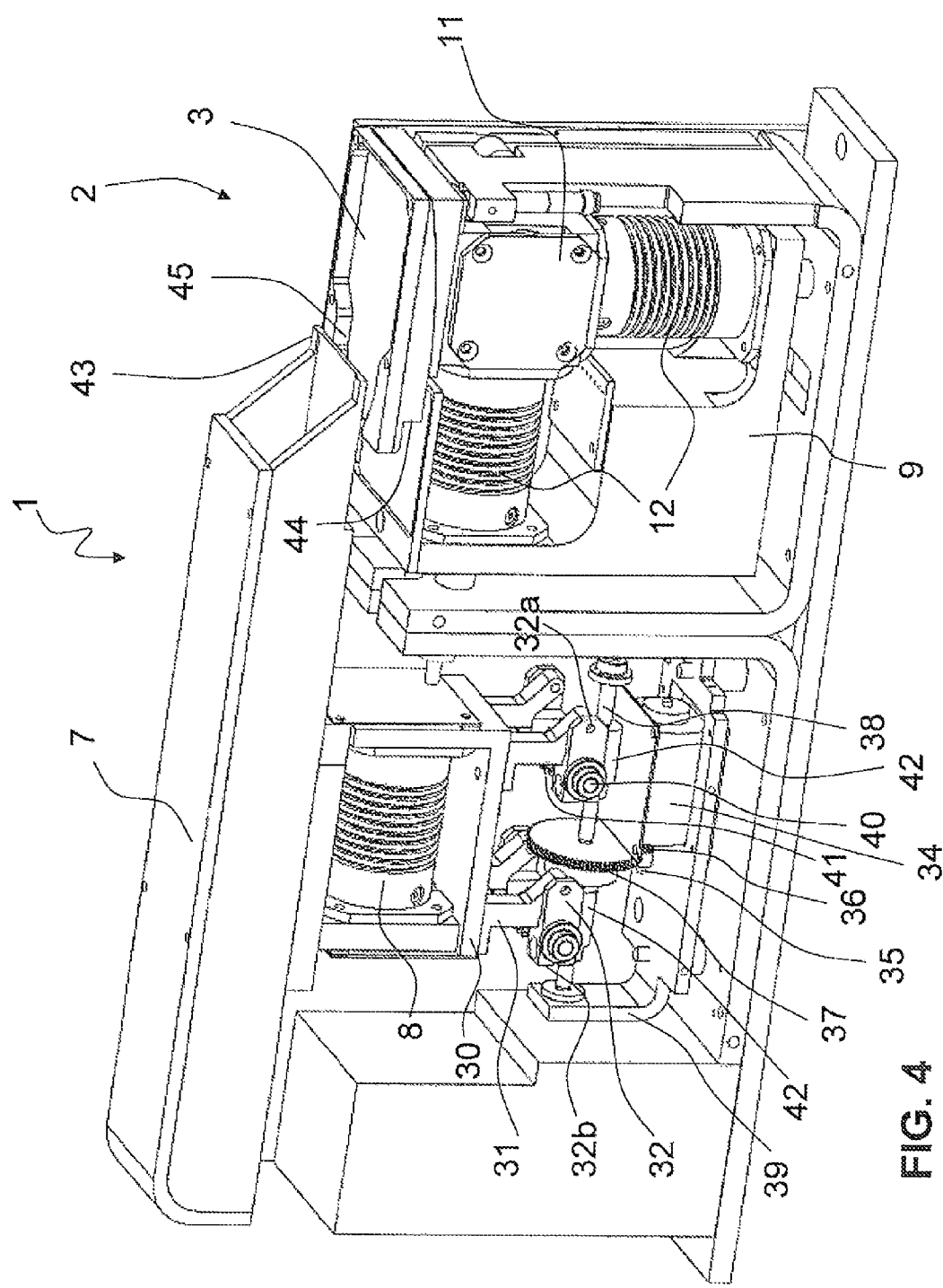
FIG. 4 is a perspective view of the vibrating device and linear conveyor, the cover having been removed.

In reference to FIGS. 1 and 4, a supply system 1 is shown for supplying components stored in bulk in a silo (not shown). Said supply system 1 comprises a vibrating device 2 equipped with a plate 3 making up a surface for enabling the components to be grasped by a robot 4 equipped with a hinged handling arm 5. To convey the components stored in the silo onto the plate 3, the supply system 1 comprises a conveyor 7, independent from the vibrating device 2. More specifically, the conveyor 7 is separated from the plate 3.

In the illustrated alternative, the conveyor 7 is a linear conveyor set in motion by a linear vibrator 8. Such a linear vibrator is known in itself and does not call for additional description. Of course any other type of conveyor, independent of the vibrating device and separate from the plate, can be used to conveyor the components onto the plate 3. The conveyor 7 can be mounted removably so that it can be disassembled and serve as a storage reservoir.

In reference more particularly to FIG. 4, the vibrating device 2 comprises a frame 9, a vibrating support 11 and a vibrating means arranged to make the plate 3 vibrate. The vibrating support 11 here is cube-shaped, its upper surface supporting said plate 3. The plate 3 can be mounted on the vibrating support 11 so as to be fixed or removable if one wishes to be able to change the plate 3 easily, so as for example to be able to adapt it to the transported components. The plate 3 can be backlit to make the components easier to view.

According to the invention, said vibrating means are arranged to be able to make the plate 3 vibrate in one of three directions x, y, z, and to be capable of vibrating the plate 3 in directions corresponding to any combination of these three directions x, y and z, at frequencies between 5 Hz and 500 Hz, preferably between 50 Hz and 300 Hz.

Figure 3:
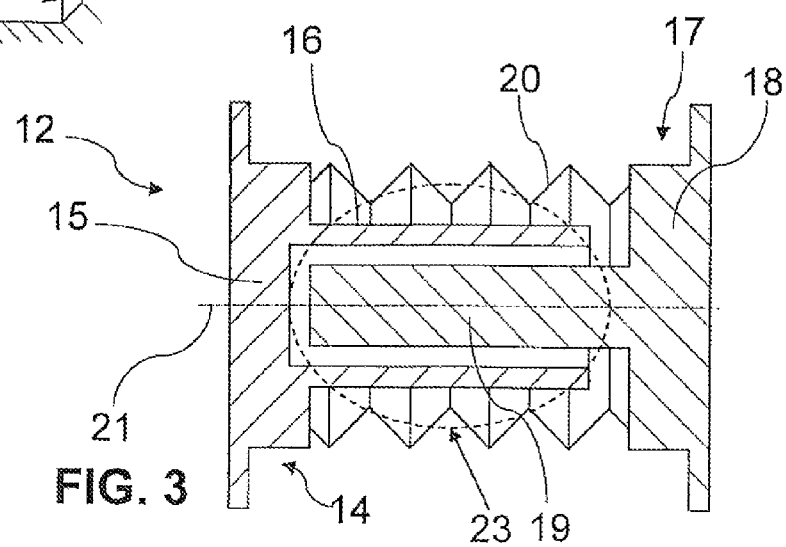
FIG. 3 is a cross-sectional view of a vibrating actuator.

To that end, the vibrating means are made up of three vibrating actuators 12, arranged and oriented relative to each other so as to obtain vibrations in one of the three directions x, y, z, and combinations thereof. Preferably, the vibrating actuators 12 are positioned in directions x, y, and z, respectively, on the faces of the vibrating support 11, with the exception of its upper face supporting the plate 3, as shown by FIG. 3. Each vibrating actuator 12 is connected on the one hand to one of the faces of the vibrating support 11 and on the other hand to one of the faces opposite the frame 9, so that the vibrating support 11 is only maintained by the vibrating actuators 12.

In reference to FIG. 3, a vibrating actuator 12 comprises a stationary element 14 comprising a base 15 mounted on the frame 9 and a hollow body 16, and a vibrating element 17 comprising a base 18 mounted on the corresponding face of the vibrating support 11 and a body 19 mounted so that it can be translated inside the hollow body 16 of the stationary element 14. The base 18 of the vibrating element 17 is connected to the base 15 of the stationary element 14 by a guide in the form of a bellows 20 arranged to allow the vibrating element 17 to move with three degrees of freedom in translation and at least two degrees of freedom in rotation. Only rotation around the axis of symmetry 21 may be prevented as a function of the rigidity of the material in which the ends of the bellows 20 are made. Thus, each vibrating actuator 12 comprises a vibrating element 17 arranged to move with five or six degrees of freedom. The bellows 20 can be made from a metal material.

Each of the three vibrating actuators 12 also comprises a vibration generator 23 arranged to move and make the vibrating element 17 vibrate relative to the stationary element 14 following a translational movement, in directions x, y and z, respectively.

The vibration generator 14 is of the piezoelectric, electromagnetic, pneumatic or hydraulic type.

The three vibrating actuators 12 are arranged to generate a vibrational movement in translation in directions x, y and z, respectively. However, the five degrees of freedom (3 in translation and 2 in rotation) imparted to each vibrating element 18 by the three actuators 12 make it possible to obtain movements of the vibrating support 11 in the three directions x, y, and z and all combinations thereof.

Each vibrating actuator 12 is controlled independently in frequency, amplitude and phase, and can produce arbitrary waves, so as to control the movement of the components as well as possible.

The supply system 1 comprises a viewing system 25 equipped with a camera and arranged to identify the position of the components on the plate 3 of the vibrating device 2 and to actuate the conveyor 7, the vibrating device 2 and the robot 4 as a function of the distribution and orientation of the components. The viewing system 25 is arranged in particular to identify any accumulations of components and to actuate the vibrating actuators 12 so as to make the plate 3 vibrate to destroy these accumulations of components and to actuate the vibrating actuators 12 so as to make the plate 3 vibrate to destroy these accumulations and distribute the components homogenously.

In the illustrated example, the supply system 1 also comprises driving means of the conveyor 7 arranged to give said conveyor 7 a circular translational movement between an upper position (a in FIG. 1), in which said conveyor 7 is positioned above the vibrating device 2, and a lower position (b in FIG. 1), in which said conveyor 7 is positioned below the vibrating device 2.

In reference to FIG. 4, said driving means of the conveyor 7 comprises a support-plate 30, on which the linear conveyor 7 and its linear vibrator 8 are mounted to be stationary.

The support-plate 30 is rectangular and comprises, distributed at the four corners thereof, four feet 31 respectively mounted freely rotating at one end 32a of the four legs 32. Moreover, each of said legs 32 is driven in rotation by its other end 32b, so as to form, with the feet 31, two deformable parallelograms, in order to impart a circular translational movement between the lower and upper positions to the support-plate 30, and therefore to the conveyor 7 and its linear vibrator 8.

Furthermore, the means for driving the conveyor 7 comprises a mechanism for driving said legs 32 in rotation.

In the illustrated alternative, the mechanism for driving the legs 32 in rotation comprises a motor 34, rotating an axis 35 on which a toothed wheel 36 is mounted. Said toothed wheel 36 meshes with a toothed wheel 37 mounted stationary on an axis 38 mounted freely rotatingly on a frame 39 of the supply system, longitudinally between two pairs of legs 32, front and rear relative to FIG. 4. Each pair of legs 32 is connected by an axis 40 that comprises a toothed wheel 41 cooperating with a worm 42 provided on the axis 38 opposite the toothed wheel 41 so as to drive the rotation of the axis 40. Mounted at each end of the axis 40 are the ends 32b of the legs 32.

The conveyor 7 has a flat transverse rim 43 at its end on the vibrating device 2 side. The plate 3 of the vibrating device 2 comprises a shoulder 44 arranged to receive the transverse rim 43 of the conveyor 7 when said conveyor 7 is in the lower position.

When the components are brought from the storage silo on the conveyor 7, the latter is in the upper position, shown in FIG. 5b. The linear conveyor 7 conveys the components on the vibrating device 2. The vibrating actuators 12 are actuated so as to make the plate 3 vibrate so that the components move on the plate 3. The camera of the viewing system 25 observes the components and the viewing system 25 commands the vibrating actuators 12 so as to make the plate 3 vibrate in all directions x, y, z and combinations thereof, so as to correctly orient the components, which are then grasped by the handling arm 5 of the robot 4. In this way, the components, even the smallest ones, can be oriented, dispersed and moved in all possible directions, so as to reach an optimal position for grasping by the robot. The vibration-observation-grasping cycle is repeated continuously.

When the transfer operation of the components is finished, unused components may remain on the plate 3.

By actuating the motor 34 and the driving means of the support-plate 30, the conveyor 7 is brought into the lower position, shown in FIG. 5a. In this way, the conveyor 7 is placed under the plate 3 so that by actuating the vibrating actuators 12 appropriately, the components on the plate 3 can be easily moved towards the rear part of the plate 3, returned to the conveyor 7 and recirculated. The rear part of the plate 3 can have baffles 45 facilitating the movement of the components of the plate 3 towards the conveyor 7 in the lower position.

The system according to the invention is particularly adapted to transporting small components, but it can of course be used for larger components.

The invention claimed is:

1. A system for supplying components comprising a vibrating device provided with a plate forming a surface for enabling the components to be grasped by a robot and vibrating means arranged to be capable of vibrating said plate in one of the three directions x, y, z, and to be capable of vibrating said plate in directions corresponding to any combination of these three directions x, y and z, wherein said vibrating means comprise vibrating actuators respectively comprising a vibrating element arranged to move with at least five degrees of freedom.

2. The system according to claim 1, wherein said vibrating means are arranged to make said plate vibrate at a frequency between 5 Hz and 500 Hz, preferably between 50 Hz and 300 Hz.

3. The system according to claim 1, wherein the vibrating device also comprises a frame, a vibrating support supporting the plate, the vibrating support being maintained by the vibrating actuators respectively connected on the one hand to said vibrating support and on the other hand to said frame.

4. The system according to claim 3, wherein the vibrating support is parallelepiped, and wherein the vibrating means is made up of at least three vibrators actuators respectively positioned in the directions x, y, and z, on the faces of said vibrating support, with the exception of the face supporting the plate.

5. The system according to claim 4, wherein each of the vibrating actuators comprises a stationary element mounted on the frame, the vibrating element being movably mounted relative to the stationary element and connected to the vibrating support, a guide in the form of a bellows connecting the stationary element and the vibrating element and arranged to allow the vibrating element to move with three degrees of freedom in translation and at least two degrees of freedom in rotation, and a vibration generator arranged to move the vibrating element and make it vibrate relative to the stationary element following a translational movement, in directions x, y and z, respectively.

6. The system according to claim 5, wherein the vibration generator is of the piezoelectric, electromagnetic, pneumatic or hydraulic type.

7. The system according to claim 3, wherein each of the vibrating actuators comprises a stationary element mounted on the frame, the vibrating element being movably mounted relative to the stationary element and connected to the vibrating support, a guide in the form of a bellows connecting the stationary element and the vibrating element and arranged to allow the vibrating element to move with three degrees of freedom in translation and at least two degrees of freedom in rotation, and a vibration generator arranged to move the vibrating element and make it vibrate relative to the stationary element following a translational movement, in directions x, y and z, respectively.

8. The system according to claim 7, wherein the vibration generator is of the piezoelectric, electromagnetic, pneumatic or hydraulic type.

9. The system according to claim 1, wherein each vibrating actuator is controlled independently in terms of frequency, amplitude and phase, and is able to produce arbitrary waves.

10. The system according to claim 1, wherein the system also comprises a conveyor arranged to convey components on the plate of the vibrating device.

11. The system according to claim 10, wherein the conveyor is a linear conveyor set in motion by a linear vibrator.

12. The system according to claim 10, wherein the system also comprises means for driving the conveyor arranged to impart a circular translational movement to said conveyor between an upper position, in which said conveyor is positioned above the vibrating device, and a lower position, in which said conveyor is positioned below the vibrating device.

13. The system according to claim 12, wherein said driving means of the conveyor comprises a conveyor support plate comprising four feet respectively mounted articulated at one end of four legs driven in rotation by their other end, so as to form two deformable parallelograms, and a mechanism for driving said legs in rotation.

14. The system according to claim 12, wherein said conveyor has, at an end thereof, on a side of the vibrating device, a transverse rim, and wherein the plate of the vibrating device comprising a shoulder arranged to receive the transverse rim of the conveyor when said conveyor is in the lower position.

15. The system according to claim 10, wherein the conveyor is mounted removably so that said conveyor can be disassembled and serve as a storage reservoir.

16. The system according to claim 1, wherein the system also comprises a viewing system arranged to identify the position of the components on the plate of the vibrating device and actuate the vibrating device and the robot as a function of the distribution and orientation of the components.

17. The system according to claim 1, wherein the entire vibrating element is configured to move with at least five degrees of freedom.

* * * * *